US007038409B1

(12) United States Patent
Mullet

(10) Patent No.: US 7,038,409 B1
(45) Date of Patent: May 2, 2006

(54) OPERATING SYSTEM UTILIZING A DELAY-OPEN FUNCTION FOR A MOTORIZED BARRIER OPERATOR

(75) Inventor: Willis J. Mullet, Gulf Breeze, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 11/082,349

(22) Filed: Mar. 16, 2005

(51) Int. Cl.
*H02P 3/00* (2006.01)

(52) U.S. Cl. ...................... 318/280; 318/283; 318/466; 318/468; 49/26; 49/28; 340/691.6; 340/461

(58) Field of Classification Search ........ 318/280–283, 318/286, 466, 468; 49/26, 28; 340/915, 340/461, 691.6
See application file for complete search history.

(56) References Cited

U.S. PATENT DOCUMENTS 1,040,504 A 10/1912 Bundy
1,874,903 A 8/1932 Conway
1,928,698 A 10/1933 Morris
2,138,521 A 11/1938 Ellis
2,758,836 A 8/1956 Purdy
2,871,009 A 1/1959 Picatti
3,060,361 A 10/1962 Purdy
3,510,982 A 5/1970 Purdy
4,035,702 A 7/1977 Pettersen et al. ........... 318/285
4,455,517 A * 6/1984 Mitchell ..................... 318/283
4,821,024 A * 4/1989 Bayha ..................... 340/309.8
5,247,232 A * 9/1993 Lin ........................... 318/468
5,357,183 A 10/1994 Lin ........................... 318/468
6,184,787 B1 * 2/2001 Morris ....................... 340/521
6,326,754 B1 * 12/2001 Mullet et al. ............... 318/480
6,469,464 B1 * 10/2002 McCall ....................... 318/445
6,563,278 B1 * 5/2003 Roman ....................... 318/282
2004/0216379 A1 11/2004 Gioia et al. .................... 49/29

* cited by examiner

*Primary Examiner*—Rina Duda
(74) *Attorney, Agent, or Firm*—Renner Kenner Greive Bobak Taylor & Weber

(57) ABSTRACT

An operating system which utilizes a multi-functional wall station for a motorized barrier includes an operator for controlling movement of a barrier between various positions. The operator may receive signals from a wireless or wired wall station transmitter, a wireless keyless entry device and/or a portable remote transmitter device. The multi-function wall station also provides for an operational selection wherein the door may be closed in a normal manner; by an auto-close/delay-open feature, wherein the door closes after a predetermined period of time; or a RF block mode, wherein the station prevents transmission of any remote radio frequency signals to the operating system. The delay-open feature is initiated by actuating a delay switch when the barrier is in a closed position. After a predetermined period of time the operator moves the barrier to an open position. The predetermined period of time is user adjustable.

15 Claims, 7 Drawing Sheets

OPERATING SYSTEM UTILIZING A DELAY-OPEN FUNCTION FOR A MOTORIZED BARRIER OPERATOR

TECHNICAL FIELD

Generally, the present invention relates to a garage door operator system for use on a closure member moveable relative to a fixed member. More particularly, the present invention relates to a wall station transmitter for controlling the operation of a movable barrier, such as a gate or door, between a closed position and an open position. One function of the wall-station transmitter provides a delay-open function which automatically opens the movable barrier a pre-determined period of time after actuating a designated switch.

BACKGROUND ART

As is well known, garage doors or gates enclose an area to allow selective ingress and egress to and from the area. Garage doors initially were moveable by hand. But due to their weight and the inconvenience of opening and closing the door, motors are now connected to the door. Control of such a motor may be provided by a hard-wired push button which, when actuated, relays a signal to an operator controller that starts the motor and moves the door in one direction until a limit position is reached. After the door has stopped and the button is pressed again, the motor moves the door in an opposite direction. Garage door operators are now provided with safety features which stop and reverse the door travel when an obstruction is encountered. Other safety devices, such as photocells and sensors, detect whenever there is an obstruction within the path of the door and send a signal to the operator to take corrective action. Remote control devices are now also provided to facilitate the opening and closing of the door without having to get out of the car. The prior art also discloses various other features which enhance the convenience of opening and closing a garage door as follows.

There is considerable work in the area of automatic delayed closing of a barrier as shown and described in the patent to Lin, U.S. Pat. No. 5,357,183. The primary object of the '183 patent is to provide an automatic closure for powered overhead garage doors after the vehicle exits or enters the garage. Another object is to provide a safety reverse if an obstruction occurs during the closure movement. Yet another object is to provide automatic closure if the garage door is inadvertently left open for a predetermined period of time, and also to provide a warning signal shortly before the garage door begins to close if it was left open for an extended period of time. For the accomplishment of the above and related objects, the device employs an add-on photoelectric sensor to detect the movement of a vehicle into or out of the garage. When a vehicle has entered or exited the garage, the photoelectric sensor signals a delay timer to energize and then an activating timer will, in turn, activate a relay to cause the opener control unit to close the door. Other situations that do not involve the movement of a vehicle to cause the garage door to close are effected by an oscillator that produces a signal every five (5) minutes or so to cause the garage door to close if it remains open for whatever reason. Such devices are now incorporated into the operator since the standalone devices add additional expense to perform these functions. Further, there is no means to defeat the add-on feature when the function is not needed or the door needs to remain open for long periods of time.

U.S. Pat. No. 6,326,754 to Mullet, et al. discloses a wireless operating system utilizing a multi-functional wall station for a motorized door/gate operator includes an operator for controlling the movement of a door/gate between various positions. The system has an operator with a receiver and a wall station transmitter for transmitting a signal to the receiver. The signal initiates separate operator functions in addition to opening and closing of the door/gate. A remote transmitter may send a remote signal received by the receiver, wherein the receiver is capable of distinguishing between the wall station signal and the remote signal. The wall station includes a transmitter programming button, wherein actuation of the transmitter programming button places the receiver in a learn mode, and wherein subsequent actuation of the remote transmitter positively identifies the remote transmitter for use with the operator. A light powered by the operator and a light actuation button provided by the wall station transmitter is included in the system. Actuation of the light actuation button functions to switch the light on or off. A pet height button, provided by the wall station transmitter, selectively positions the height of the gate/door from its fully closed position to allow ingress and egress of a pet. A delay-close button closes the door/gate after a predetermined period of time. Actuation of a door installation button sequences the door/gate and said operator through various operational parameters to establish a door operating profile. All of the buttons on the wall station are exposed which allows some of them to be accidentally actuated. A keyless entry transmitter and a second wall station may also control the operator. The disclosed method of automatically closing the door is focused on delaying the door closing to allow an individual to exit the garage without tripping the secondary entrapment devices such as photo cells. The delay close feature provides no means of external adjustment of the time period for activating the closing of the door and it only provides this function if activated with the door in the open position. The delay close feature will not automatically close a door that has been left open or opened by the extrinsic sources mentioned above. Further there is no means of choosing between fully automatic delayed close and normal operation other than depressing the correct button on the wall station which needs to be done each time.

Other operator devices may incorporate "hands-free" features such as disclosed in U.S. Pat. application Ser. No. 10/744,180 which is assigned to the assignee of the present application. The features described therein to control the barrier are based on proximity conditions and positions of a mobile unit, and a base unit maintained in the operator. One type of condition that may be recognized is when the mobile unit is directly connected to the mobile unit's ignition switch. But, if the user declines to undertake the added expense of a hands-free system, they must first activate a wall station door up button and then enter their automobile. However, during inclement weather, the user may first enter the automobile, locate their remote transmitter and then open the barrier. This scenario can be troublesome if the remote transmitter has been taken inside or the user's automobile interior is messy and the transmitter cannot be found.

The systems described above are lacking in that they do not provide an automated delay opening feature. Nor does any known system provide a delay opening feature in combination with a delay close feature, or where these features can be easily turned off and on.

DISCLOSURE OF INVENTION

It is thus a first aspect of the present invention to provide an operating system utilizing a delay-open function for a motorized barrier operator.

Yet still a further aspect of the present invention is to provide an operator system for moving a barrier, comprising a motor; an operator which controls operation of the motor, the motor moving the barrier between opened and closed positions; a wall station having a wall station transmitter which sends operational signals to the operator, the wall station having an open/close switch that when actuated moves the barrier in the appropriate direction; and a delay switch connected to the wall station transmitter wherein if the delay switch is actuated when the barrier is in a closed position, the operator moves the barrier to an open position after a predetermined period of time.

Yet another aspect of the present invention is to provide a method for controlling movement of a barrier, comprising receiving operational signals from a transmitter device in an operator which controls movement of the barrier; generating a delay open signal from the transmitter device when a delay switch is activated the barrier is in a closed position; and moving the barrier to an open position a pre-determined period of time after the delay open signal is received by the operator.

BRIEF DESCRIPTION OF THE DRAWINGS

For a complete understanding of the objects, techniques and structure of the invention, reference should be made to the following detailed description and accompanying drawings, wherein.

PREFERRED EMBODIMENT FOR CARRYING OUT THE INVENTION

Figure 1:
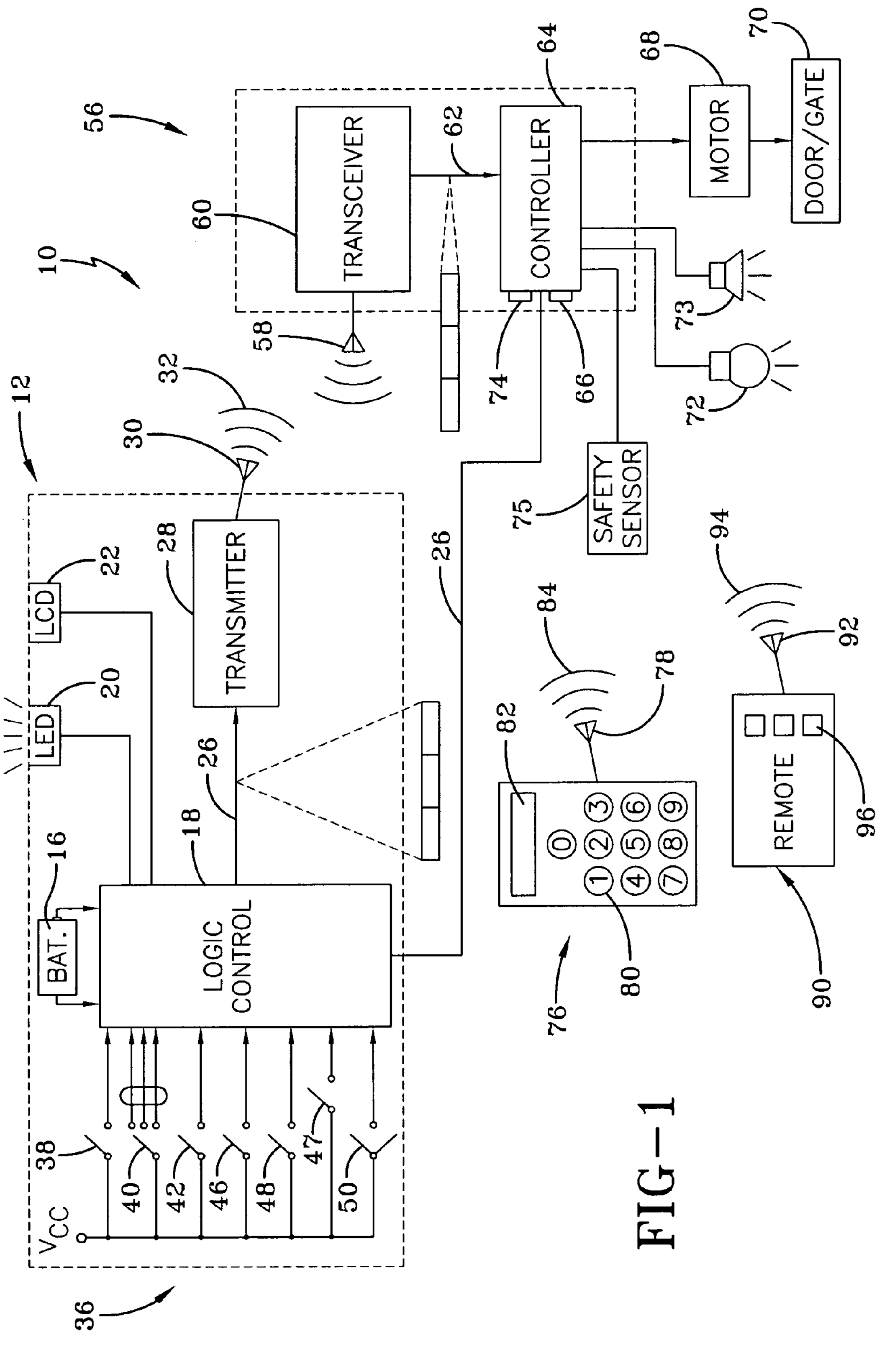
FIG. 1 is an operating system for a motorized barrier operator according to the present invention.
Figure 3:
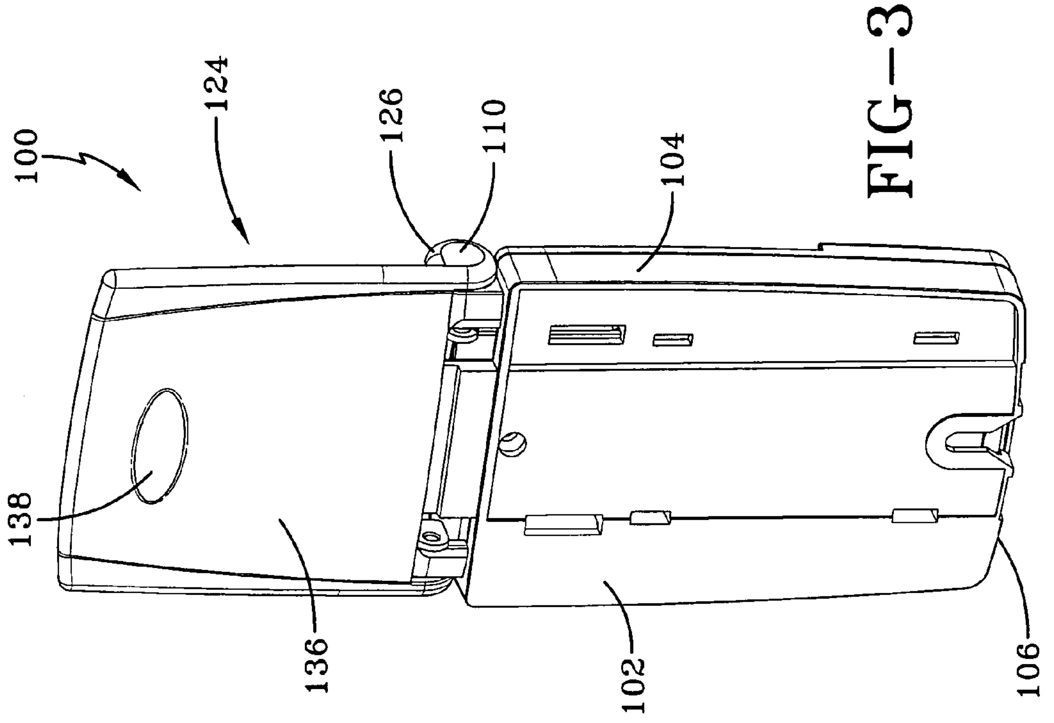
FIG. 3 is a rear perspective view of the multi-function wall station.
Figure 2:
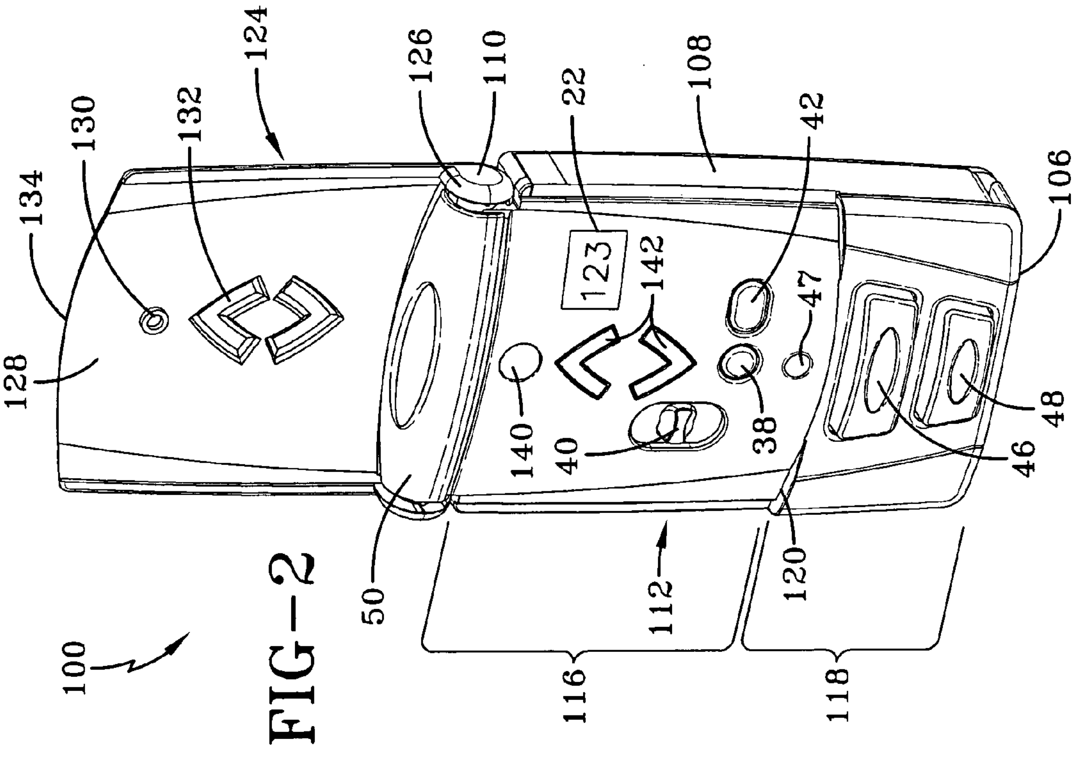
FIG. 2 is a front perspective view of a multi-function wall station embodying the concepts of the present invention.

An operating system for a motorized door or gate operator according to the concepts of the present invention, depicted in FIG. 1 of the drawings, is generally indicated by the numeral 10. The system 10 may be employed in conjunction with a wide variety of movable barrier doors or gates, wherein the doors are of the type utilized in garages, commercial and utility buildings, and other structures, as well as windows or other closure members, all of which may be linear, curved, or otherwise non-linear, in whole or in part. Such barriers or other members are commonly constructed of a variety of materials such as wood, metal, various plastics, or combinations thereof. The lower extremity of doors or other member of these various types may be substantially rectangular or may be profiled in any number of ways for the positioning of reinforcing members or other purposes. In the preferred use, the present invention is utilized with residential-type garage doors. Generally, the system 10 of the present invention employs a multi-function wall station generally designated by the numeral 12. The wall station 12 is typically placed near a pedestrian door that enters the garage from the interior of the house and is positioned at a convenient height, preferably five feet above the ground. The wall station 12 includes a housing typically made of polymeric material, wherein at least a portion of the housing is removable to allow access to the internal workings thereof when needed.

The wall station 12 includes a battery compartment 15 (best seen in FIG. 5) for receiving a power supply 16 which is two AAA dry cell batteries. The power supply is used to provide electrical power to various components contained within the wall station as will become apparent as the description proceeds. It will be appreciated that power could be received from a residential power source or equivalent if desired. If such is the case then appropriate transformers will be needed to power the internal components. In any event, use of the dry cell batteries provide the necessary power and allow for the wall station to be placed anywhere within communication range of the operator and eliminates the need for obtaining power directly from the operator or other source. One component which is connected to the power supply is a logic control 18 which is a microprocessor based circuit that provides the necessary hardware, software and memory for implementing the functions to be described. An LED 20 is connected to the logic control and receives power from the power supply 16 in a manner well known in the art. Also connected to the logic control 18 may be a liquid crystal display 22 or other low-power display for providing operational information related to the wall station 12 and/or other components of the operating system 10.

The logic control 18 generates various signals 26 which are used by a transmitter 28 for conversion to a radio frequency signal (RF) that is emitted by an antenna 30. Of course other wireless types of signals, such as infrared or acoustic, could be generated by the transceiver 28 if desired. The transmitter may also function as a transceiver to allow for display of operator status information on liquid crystal display 22. As used herein, the term "transceiver" indicates that the device can both transmit and receive wireless signals. In any event, it will be appreciated that ideally the wall station 12 is a wireless device; however, if the need arises a wire could be used to directly transmit the signal 26.

The wall station 12 includes a plurality of input switches or buttons designated generally by the numeral 36. These input switches, when actuated, allow the user to control various features of the operating system. The switches 36 include an up/down switch 38; a 3-way selection switch 40, which provides the modes of manual close, auto-close/delay-open, and radio frequency blocking; an install switch 42; a delay switch 46; a delay timer switch 47; a pet height switch 48; and a light on/off switch 50. The up/down switch 38 is actuated whenever the user wants to move the barrier from an up condition to a down condition or vice versa. The 3-way selection switch 40 provides for different operational modes. Briefly, the manual close mode allows the operating system 10 to operate in much the same manner as would a normal operating system inasmuch as user input is required to open and close the movable barrier. The auto-close/delay-open mode provides a dual function. In particular, the auto-close feature allows for the movable barrier to close if left in a fully open position for a predetermined period of time and provided that other conditions are met. The delay-open feature allows for a delayed opening of the barrier if in a fully-closed position. The radio frequency blocking mode is for when a user is on vacation and desires that no external or remote wireless transmitters allow for operation of the movable barrier. The install switch 42 provides for an installation routine to set the operational limits of the movable barrier with respect to the other physical parameters of the movable barrier. In other words, barrier travel limits and force profiles are generated during the actuation of the install routine. If the barrier is fully open and the auto-close/delay-open feature is enabled, then actuation of the delay switch 46 allows for a user to exit the enclosed area within a predetermined period of time without inadvertently actuating safety features such as photoelectric eyes and the like. And, if the barrier is fully closed and the auto-close/delay-open mode is enabled, then actuation of the delay switch 46 allows the user to get into the automobile prior to opening of the barrier. The timer switch 47 allows the user to adjust the time between when the delay switch 46 is actuated and when the action by the control 18 is taken to move the barrier. Adjustment of the delay time may be accomplished by actuating and holding the switch 47 which causes a time period in minutes and/or seconds to be displayed on the LCD 22. This time period may then be adjusted by actuating one of the other switches—such as the light switch 50—while the switch 47 is held. Each actuation of the switch 50, while the switch 47 is held, causes the time period displayed to be incrementally adjusted through various values ranging from a short time period (15 seconds) to a long time period (five minutes) wherein actuation of the switch 50 when the longest time period is displayed will revert to the shortest time period available. The range of time periods and the increments therebetween may be adjusted in the control 18 as needed. It will be appreciated that the selection switch's auto-close/delay-open mode may be only a delay-open mode, or enablement of the auto-close and delay-open modes may be accomplished with independent switches connected to the logic control 18. Actuation of the delay switch 46 may also initiate illumination of the light 72 during the selected delay period and for a period of time after movement of the barrier is completed. It will be appreciated that use of the timer switch 47 is optional inasmuch as the delay time may be factory set in the logic control 18.

The pet height switch 48 allows for the door to be moved to a minimal open position of anywhere from 4 to 12 inches to allow the ingress and egress of small pets. The light switch 50 may be activated in either of two directions and turns a light associated with the operating system 10 on or off.

The operating system 10 includes an operator which is designated generally by the numeral 56. The operator 56 includes an antenna 58 for receiving the RF signal 32 or any other type of signal associated with other transmitters. In any event, the received radio frequency signal 58 is transmitted to a transceiver 60 which converts the radio frequency signal into a code signal 62 that is received by a controller 64. Alternatively, the controller 64 may receive the data signal 26 directly by a wire as previously discussed. The controller 64 provides the necessary hardware, software and memory for use of the operating system 10. Associated with the controller 64 may be a LED program light 66 which indicates the operational status of the controller 64. The controller 64 is coupled to a motor 68. The controller 64 receives various types of operational signals such as the commands from the various transmitters, safety signals from any connected safety devices, and status signals from the motor to coordinate movement of the barrier. The motor controls movement of the barrier through various drive mechanisms. A light 72 may be associated with the controller 64 for the purpose of illuminating the area enclosed by the barrier. A speaker 73 is also connected to the controller and may be used to announce a programming state or mode. A transmitter program button 74 is connected to the controller for the purpose of allowing programming of the wireless control devices such as the wall station, remote transmitters and the like to the operator 56. The transmitter program button 74 must be actuated to place the operating system in a program mode for the purpose of learning any one of the transmitters disclosed herein to the controller. And a safety sensor 75 may be connected to the controller 64. The sensor 75 may be a photo-electric safety sensor, a door edge sensor or any other sensor that detects application of an excessive force or of an object in the barrier's path by the moving door in either one or both directions.

One of the external transmitters that may be associated with the operator 56 is a keyless external transmitter designated generally by the numeral 76. The keyless transmitter 76 provides an antenna 78 for transmitting and, if needed, receiving signals to and from the operator 56. The keyless transmitter 76 includes a keypad 80 which allows for the user to enter a predetermined identification number or code to initiate movement of the barrier. A liquid crystal display 82 may be associated with the keyless transmitter if desired. In any event, upon completion of the entry of the identification number a radio frequency signal 84 is emitted by the antenna 78 and received by the antenna 78 for transmission to the transceiver 60.

Another type of external transmitter is a remote transmitter designated generally by the numeral 90. The remote transmitter 90 provides an antenna 92 which emits a radio frequency signal 94 for receipt by the transceiver 60. It will be appreciated that the remote transmitter 90 may include its own controller for the purpose of generating the appropriate radio frequency signal. Fixed code or rolling code technology may be used for communication of the transmitters with respect to the operating system 56. The remote transmitter may include a plurality of function buttons 96 that independently control other features associated with the operating system. In particular, actuation of one of the buttons may be used solely for control of the door/gate or barrier while another of the buttons may independently control the light 72 associated with the operating system or other related features.

Referring now to FIGS. 2–5 it can be seen that the wall station 12 utilizes a housing designated generally by the numeral 100. The housing 100, which may either be mounted by a screw, tape or other fastener, is secured to a wall in radio frequency range of the operator and includes a back panel 102 that faces the wall surface. Connected to the back panel 102 is a side panel 104 and a bottom panel 106. A battery cover 108 is coupled to the housing 100 and is preferably positioned on a side opposite the side panel 104. The battery cover 108 is selectively detachable from the housing 100 and retains the power supply 16. The housing 100 also includes a pair of axially extending pins 110 that are preferably positioned at a top edge of the panel 102. Extending from the housing 100 and facing outwardly is a front panel 112 which may be segmented into three sections. One section comprises the light switch 50 and is positioned at a top edge of the housing. The light switch 50 is preferably actuable from two different directions. In other words, if a person desires to actuate just the light 72 associated with the operator 56, then the light switch may be actuated in one of two directions. The light switch can be actuated by applying a downward force or a normal force with respect to the front panel 112. The front panel 112 also includes a recessed panel 116 which is disposed between the light switch 50 and an exposed panel 118. A partition 120 may be provided to separate the recessed panel and the exposed panel.

A hinge cover 124 is attached to the housing 100 and is movable with respect thereto. In the preferred embodiment the hinge cover is made of a translucent or transparent polymeric material. The cover 124 includes a pair of opposed collars 126 which slidably rotate about the axial pins 110. If desired, the collars 126 may be cammed in such a way that the cover 124 may be rotatably opened and stay in place while the user accesses the recessed panel 116 without having to manually hold the cover 124. The cover 124 provides an interior surface 128 that faces the recessed panel 116 when the cover is closed. Extending from the interior surface 128 is a projecting nub 130 which functions as a force transmitting member. Also provided in the interior surface 128 is a diffuser 132 which will be discussed in further detail. Opposite the top edge of the hinge cover 124 is a distal edge 134 which nests or mates with the partition 120 when the cover is closed. Opposite the interior surface 128 is an exterior surface 136. Provided on the exterior surface 136 is a depression 138 which is substantially opposite the location of the projecting nub 130. Alternatively, any distinguishable tactile surface may be used in place of the depression.

Figure 5:
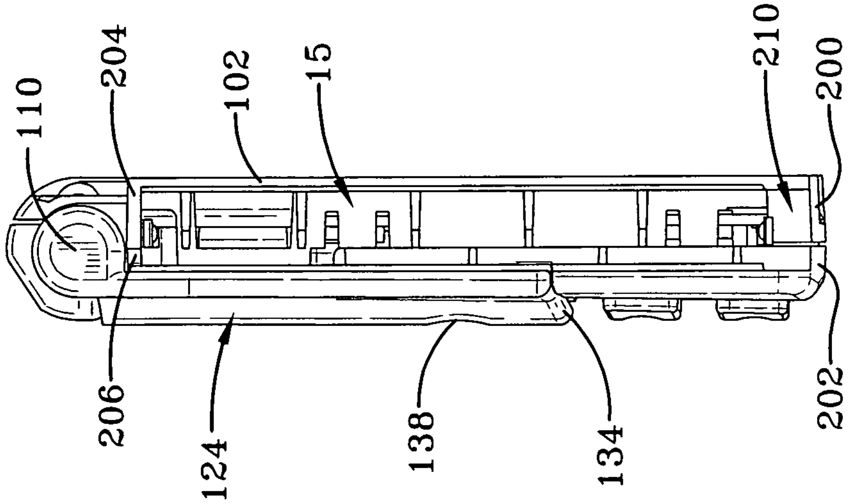
FIG. 5 is a side elevational view of the multi-function wall station with the battery cover removed.
Figure 4:
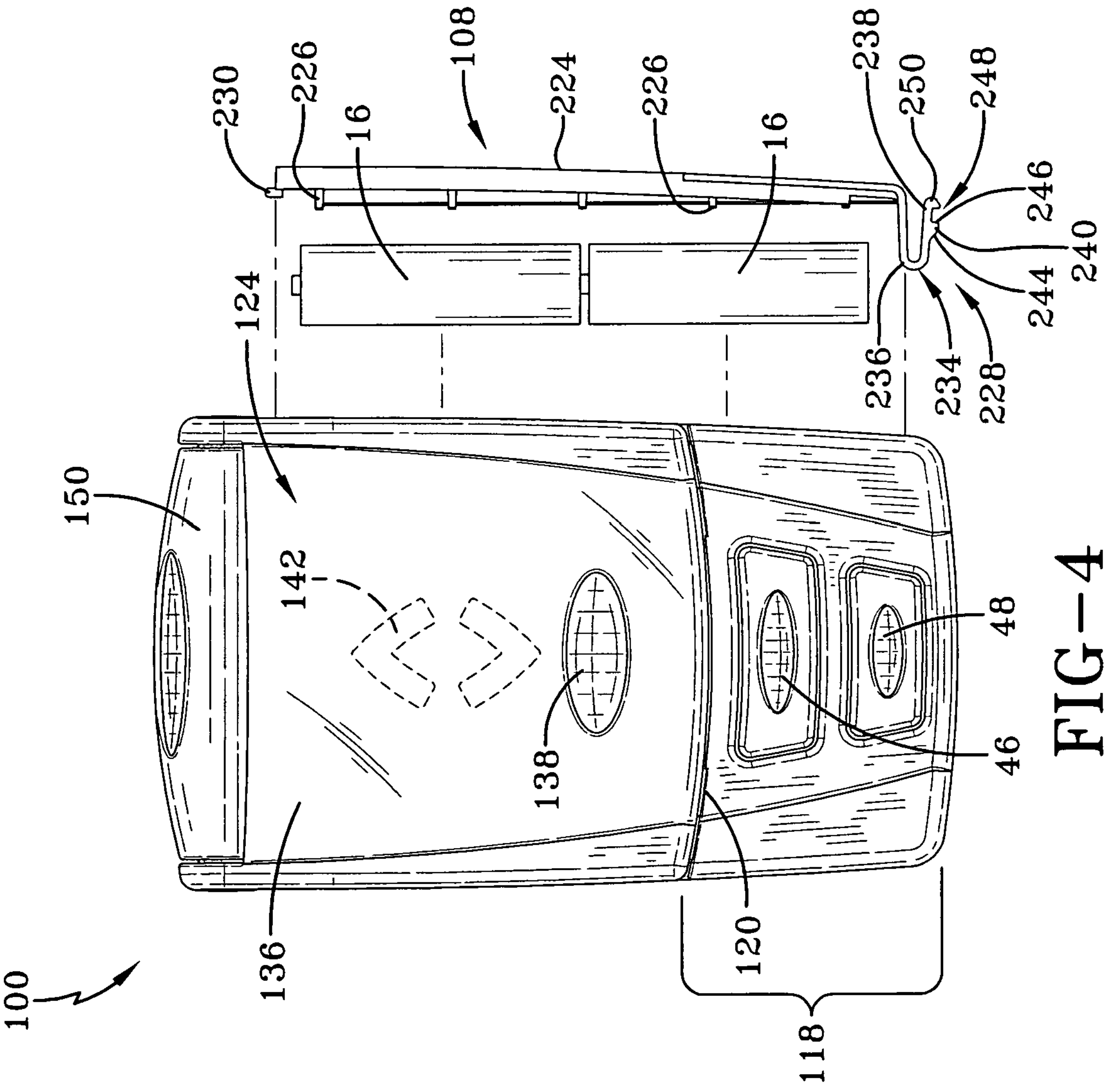
FIG. 4 is a front exploded elevational view of the multi-function wall station with the hinge cover in a closed position.

As best seen in FIGS. 4 and 5, when the hinge cover is closed, only the light switch 50, the delay switch 46 and the pet height switch 48 are exposed. Accordingly, the recessed panel 116 is covered by the cover 124. Those components provided in the recessed panel area 116 include the up/down switch 38, the 3-way selection switch 40, the installation switch 42, the timer switch 47 and, if provided, the liquid crystal display 22. Also provided in the recessed panel area is a mounting hole 140 which allows for receipt of a screw or fastener for mounting of the wall station to the desired surface. Also provided on the recessed panel 116 is a light pipe 142 which transmits light illuminated by the light emitting diode or diodes 20. During operation, the LEDs 20 blink at a predetermined rate of about once per second. With the hinge cover closed, the LEDs emit a light that is captured by the light pipe 142. The diffuser 132 is positioned directly over the light pipe when the cover is closed and light is emitted outwardly therefrom. Accordingly, in a darkened enclosure area, the user can easily find the location of the wall station when the cover is illuminated so as to allow for actuation of the light switch 50. And with the hinge cover in the closed position it will be appreciated that all of the buttons maintained on the recess panel are covered and not readily accessible. However, by providing a projecting nub 130 opposite the depression area 138 a user can easily find this depression area from the light emitted by the LEDs and by pressing the depression area 138 a resulting force is transmitted by the nub 130 to actuate the switch 38. Accordingly, the hinge cover itself functions as an open/close button when the cover is in a closed position. When the cover is in a closed position and pressed it is allowed to rotate or move as needed so as to permit full actuation of the switch 38 without actuating any of the other buttons or damaging any of the components maintained on the recess panel 116.

The hinge cover is made of a translucent or transparent material so that the LEDs may illuminate the entire surface of the hinge cover. However, if desired, a label may be placed on the inside surface of the hinge cover to provide instructions to the user. The diffuser area 132 will not be covered by the label so as to permit transmission of light from the light pipe 142 through the cover so as to be viewable by the user.

With the hinge cover in the closed position, the user may access four of the buttons associated with operation of the operating system 56. In particular, the user may actuate the light switch 50 by pressing the top edge or front top edge of the housing. The second button that may be actuated is the up/down switch by pressing the hinge cover so as engage the button 38 with the force member 130. The other two exposed buttons are the delay switch 46 and the pet height switch 48. The hinge cover 124 allows for selected concealment of the other switches maintained on the recess panel as previously indicated. The 3-way selection button 40 provides for three different options as determined by the end user. The first option, which is a default option, is for the manual close of the barrier. In other words, in this mode the user is only able to open and close the door by actuating the up/down switch 38, or by actuation of the remote transmitter 90 or the keypad transmitter 76 that has been programmed to the operator. In the second mode, the user may select an auto-close/delay-open embodiment. In this mode the garage door or barrier may automatically close after a predetermined period of time from its placement in an open position. This allows the user to have a level of confidence that the enclosure surrounded by the barrier is closed after a period of time in the event that a down button is forgotten to be pushed after leaving the garage, or the garage is left open after entering the building. In order for this feature to be fully enabled in a preferred embodiment, the switch is placed in the auto-close mode, whereupon the operator will respond by blinking the light 72 or emitting an audible sound from the speaker 73 for a predetermined period of time such as 60 seconds. During this time a correct identification number must be entered on the keypad 76. If the ID number is accepted, confirmation of the auto-close feature is communicated by flashing the light 72 on and off a predetermined number of times. While in the auto-close mode all other programmed transmitters may be used to control movement of the barrier. Requiring the programming of the keypad 76 ensures that the user has some way of re-entering the area enclosed by the barrier in the event of closure. The other feature of the auto-close/delay-open embodiment is that the door opens from a fully closed position a predetermined period of time after activation of the delay switch 46. Implementation of this feature will be described later. The third option for the 3-way selector switch is disablement of all operator operation except for return to one of the other two modes provided by the switch. This may also be referred to as a "vacation lock" mode wherein the opener operating system 10 will not respond to any transmitter open signal. In other words, the only way to open and/or close the barrier is by moving the 3-way selector back to the default manual open/close switch or to the auto-close/delay-open position followed by activation of the open/close switch of a transmitter or wall station up/down command. Open or close signals received from the wireless programmed transmitters—the wall station, a hand held remote or a keyless entry pad—while in the vacation lock mode will be ignored by the controller 64.

Figure 6:
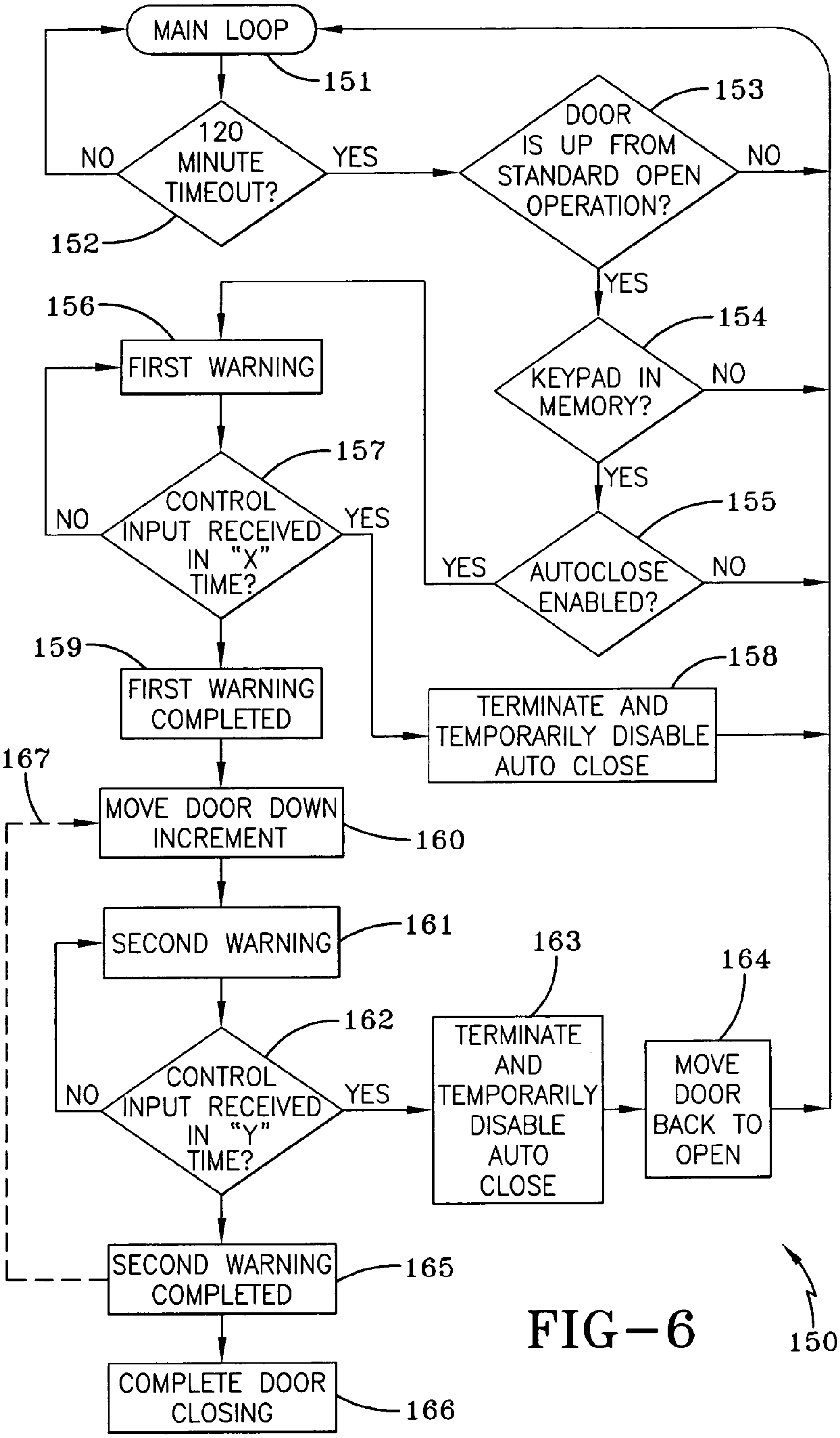
FIG. 6 is an operational flowchart setting out the operational steps for the auto-close feature.

Referring now to FIG. 6, it can be seen that an operational flow chart designating steps for enabling an auto-close feature is designated generally by the numeral 150. Initially, at step 151, the controller cycles through a main loop and the steps taken herein are a portion of that main loop. At step 152, a timer is investigated to determine whether a predetermined period of time has expired which may be set to one hundred twenty minutes. Of course, other time periods could be used. If the timer has not expired, the flow chart returns to step 151. If, however, it is determined that the one hundred twenty minute timer has expired the process proceeds to step 153.

The following three steps are queried to determine whether the necessary requirements are in place for initiation of an auto-close door movement. Depending upon the position of the barrier—the barrier must be in the fully opened or fully closed position for this mode to be operative—actuation of the delay switch initiates a timer. Upon expiration of the timer, the operator moves the barrier from one position to the other. Accordingly, at step 153 the process determines whether the door is in a complete up position resulting from a standard open operation. In other words, the controller determines whether the door is in a fully up limit position and confirms that the door is in this up position as a result of a normal door operation. If the door is in the up position as a result of safety reversal or interrupted auto-close door movement then the process is returned to the main loop 151 until such time that a correct and successful door open operation is completed. Following step 153 the controller determines whether a keypad transmitter has been programmed to operate the controller at step 154. If not, the process proceeds or returns to step 151. If a keypad transmitter has been properly entered then the process continues on to step 155 to confirm that the auto-close switch has been selected and that a valid keypad transmitter has been received after the auto-close/delay-open switch position has been selected. Confirmation of the presence of a keypad transmitter ensures that the user is able to re-enter the garage in the event of a door closure. If a keypad transmitter is not connected, the process again returns to step 151. If however, the auto-close feature has been determined to be enabled at step 155 then the process proceeds to step 156 where a first warning is initiated. This warning may be in the form of flashing of the light 72 or emission of a series of beeps from an audible speaker if connected to the controller. If during the warning signal period of about 10 seconds or some other time period a control input is received at step 157, then at step 158 the auto-close procedure is terminated and temporarily disabled and the process returns to step 151. This temporary disablement of the auto-close feature is discontinued upon a correct and successful door open operation. In any event, upon completion of the warning signal period at step 159 a first door down movement or increment, at step 160, is initiated. This results in the door moving a predetermined length of travel such as three to six inches from the fully-open limit position and the controller initiates a stop and pause and then initiates a second warning period of about 10 seconds or some other time period at step 161. If any type of control input is then received at step 162 during the warning period then at step 163 the auto-close procedure is terminated and once again that feature is temporarily disabled. The process then continues at step 164 and the door is returned to its fully open position and then the process returns to step 151. This temporary disablement is not withdrawn until a successful open procedure is implemented. If however, at step 165 the second warning period is completed without any control input being received then the process proceeds to step 166 and a complete door closing procedure is implemented.

In a variation of the foregoing process, it will be appreciated that the process may continue at step 167—from step 165—and only move down an increment so as to periodically move the door, issue a warning, and then move the door again. Accordingly, the door is closed after completion of a series of door movement increments. This feature is envisioned for use where the door's downward force is at a higher level and the incremental movement provides an added precaution.

If it is desired, the controller 64 may be programmed so as to allow the user to adjust the timer associated with the auto-close function. This may be implemented in any number of ways and an exemplary way would likely incorporate opening the cover so as to expose the buttons on the recess panel. The user might then simultaneously hold one or more of the buttons wherein the display 22 provides the information regarding the amount of time associated with the auto-close feature. It is envisioned that the auto-close feature would be limited to a range of time such as from fifteen minutes to two hours. The display could also provide an operational status of the system.

Figure 7:
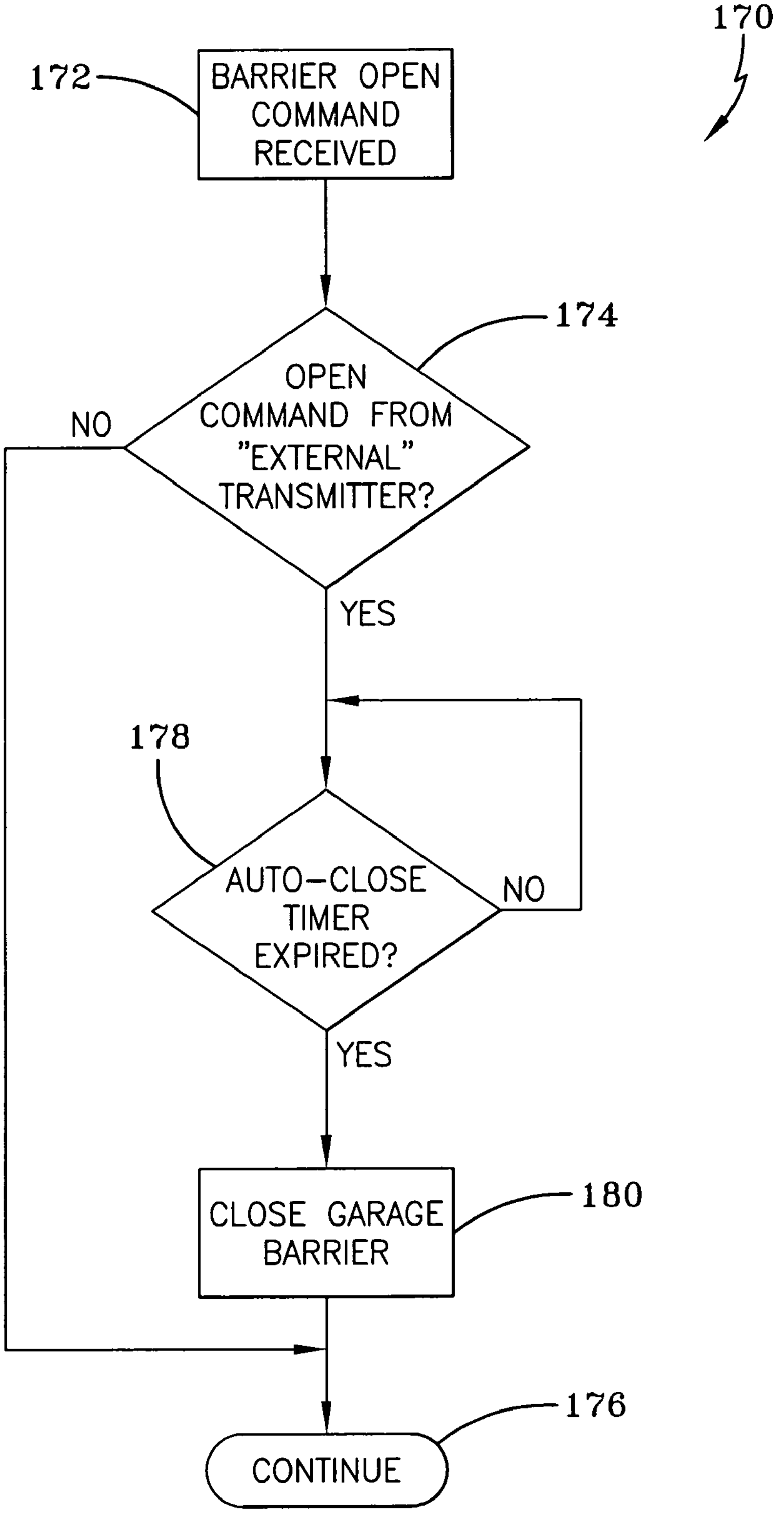
FIG. 7 is an operational flowchart wherein the auto-close feature is only enabled if an open command is received from an external transmitter.

Referring now to FIG. 7, operational steps are designated generally by the numeral 170 for an embodiment which is automatically initiated by the controller. In other words, the auto-close feature is only enabled upon actuation of an open command from an "external transmitter," which in this embodiment means the keyless transmitter or any remote transmitter. For example, any transmitter other than a wall station transmitter. At step 172 a barrier open command is received by the controller and the door is opened. Next, at step 174, the controller determines from what type of transmitter device the open command was received from. If the open command was not received from an external transmitter, in other words, the open command was received from the wall station, then the process proceeds to step 176 to continue with normal operation. If however, at step 174, the opening command was received from an external transmitter such as a keyless entry device or a remote transmitter then the process proceeds to step 178 and the auto-close timer is enabled. At step 178, the auto-close timer is continually queried as to whether the timer has expired and once it has, then the process proceeds to step 180 so as to execute the auto-close steps designated in the flow-chart 150. The process then continues at step 176 and proceeds with the other features of the control system.

This feature of the system ensures that the door will not be inadvertently closed unless the user has the ability to re-open the barrier with a keyless entry device or a remote transmitter. Additionally, it will be appreciated that the specific type of external transmitter may be specified in the controller software program and wherein the preferred embodiment the type of external transmitter is limited to a keyless entry device.

Figure 8:
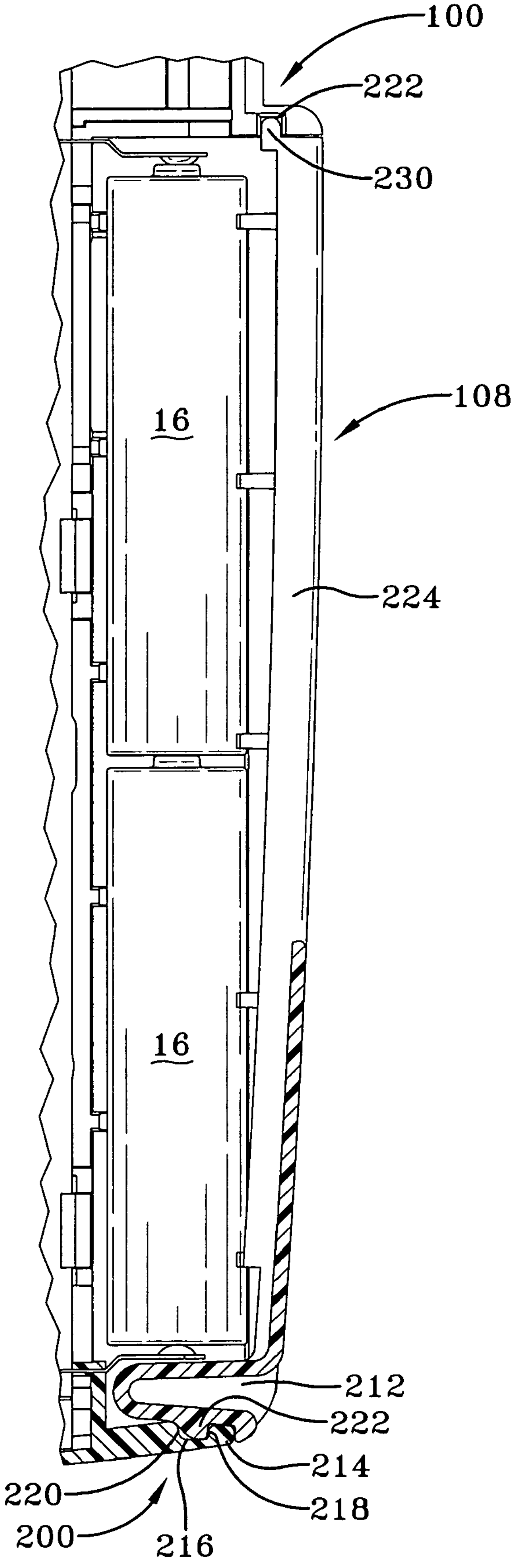
FIG. 8 is a partial elevational view of the housing's battery compartment with a front panel of the housing removed.

Referring now to FIGS. 4, 5 and 8 it can be seen that the battery cover 108 is detachably securable to the housing 100. The housing includes the back panel 102 from which extends a back ledge 200 and a panel ledge 202. The back ledge 200 extends from the back panel 102 toward the front panel 112 at the bottom edge of the housing while the panel ledge 202 extends from the front panel toward the back panel. In a similar manner, a back ridge 204 extends from the back panel toward the front panel and a panel ridge 206 extends from the front panel 112 toward the back panel 102 at a top edge of the housing. It will be appreciated that the back ledge 200 and the panel ledge 202 form a substantially continuous ledge from the back panel toward the front panel. In a similar manner, the panel back ridge 204 and the panel ridge 206 form a substantially continuous ridge. The ledges 200, 202; the ridges 204, 206; and the panels 102, 112 define the battery compartment 15. Included within the battery compartment 15 is a hinge cavity 210. The back panel provides a panel edge surface 212 from which extends the ledge 200. The ledges include a nub 214 which does not extend fully to the outer periphery of the edge surface 212. Adjacent the nub 214 and positioned inwardly toward the hinge cavity 210 is a groove 216. The groove 216 provides a catch surface 218 and a stop surface 220 which forms a portion of the nub 214. The ridges 204, 206 form a notch 222 within the battery compartment 15.

The cover 108 is detachably secured to the housing 100 and in particular it covers the battery compartment 208 including the hinge cavity 210. As best seen in FIGS. 4 and 8, the battery cover includes a wall 224 which has a plurality of inwardly extending ribs 226 along the inwardly facing surface thereof. The ribs 226 function to securely hold the batteries 16 in place with the cover 108 attached to the housing. The wall 224 includes a catch 228 at a bottom end and a latch 230 at a top end. The latch 230 extends inwardly—in the same direction as the ribs 226—and upwardly from a top edge of the wall 224 and is receivable in the notch 222.

The catch 228 includes a U-shaped member 234 which includes a pivot point 236. Extending from the pivot point is a lever arm 238 from which extends a retainer 240 that has a ramp surface 244 and a corner surface 246. Also extending in the same direction as the retainer 240 is a finger 250 which preferably does not extend beyond the panel edge surface 212 when the cover is installed. Formed between the retainer 240 and the finger 250 is a slot 248. When the battery cover 108 is installed, the retainer 240 is mateably received within the groove 216 and the nub 214 is received in the slot 248. Moreover, the corner surface 246 is in juxtaposition to the stop surface 220 while the ramp surface 244 is in juxtaposition to the catch surface 218.

After the batteries 16 are installed in the compartment 15 the cover is installed by first angularly positioning the latch 230 into the notch 222. The cover 108 is then rotated inwardly so that the U-shaped member 234 is received into the hinge cavity 210. As the lever arm 238 engages the ledges 200, 202, the ramp surface 244 contacts the nub 214. At this time lever arm 238 is deflected at the pivot point 236 until such time that the retainer 240 clears the nub 214. As soon as the corner surface 246 passes the trailing edge of the nub 214, the retainer 240 is received in the groove 216 by virtue of the spring-like nature of the catch 234. Likewise, the slot 248 is nested around the nub 214 wherein the finger 250 partially surrounds the nub.

Removal of the battery cover is essentially accomplished by reversal of the above steps. In particular, the user will insert their fingernail or some other force transmitting member between the finger and the nub so as to deflect the lever arm upwardly at the pivot point. This disengages the catch 228 from the groove 216. The catch 228 is then moved such that the latch 230 rotates slightly and then the cover is withdrawn from the notch 222. It will be appreciated that the battery cover construction, which is mateable with the housing 100, is advantageous inasmuch as the catch mechanism has two mating or nesting surfaces. In particular, the retainer 240 is received in the groove 216 while the nub 214 is received in the slot 248. Accordingly, this construction along with the flexible nature of the catch allows for easy removal of the cover without the need for other tools such as a screwdriver which would otherwise damage the battery cover. Accordingly, the present construction is an improvement over previously known battery covers employed with wall station transmitters.

Figure 9:
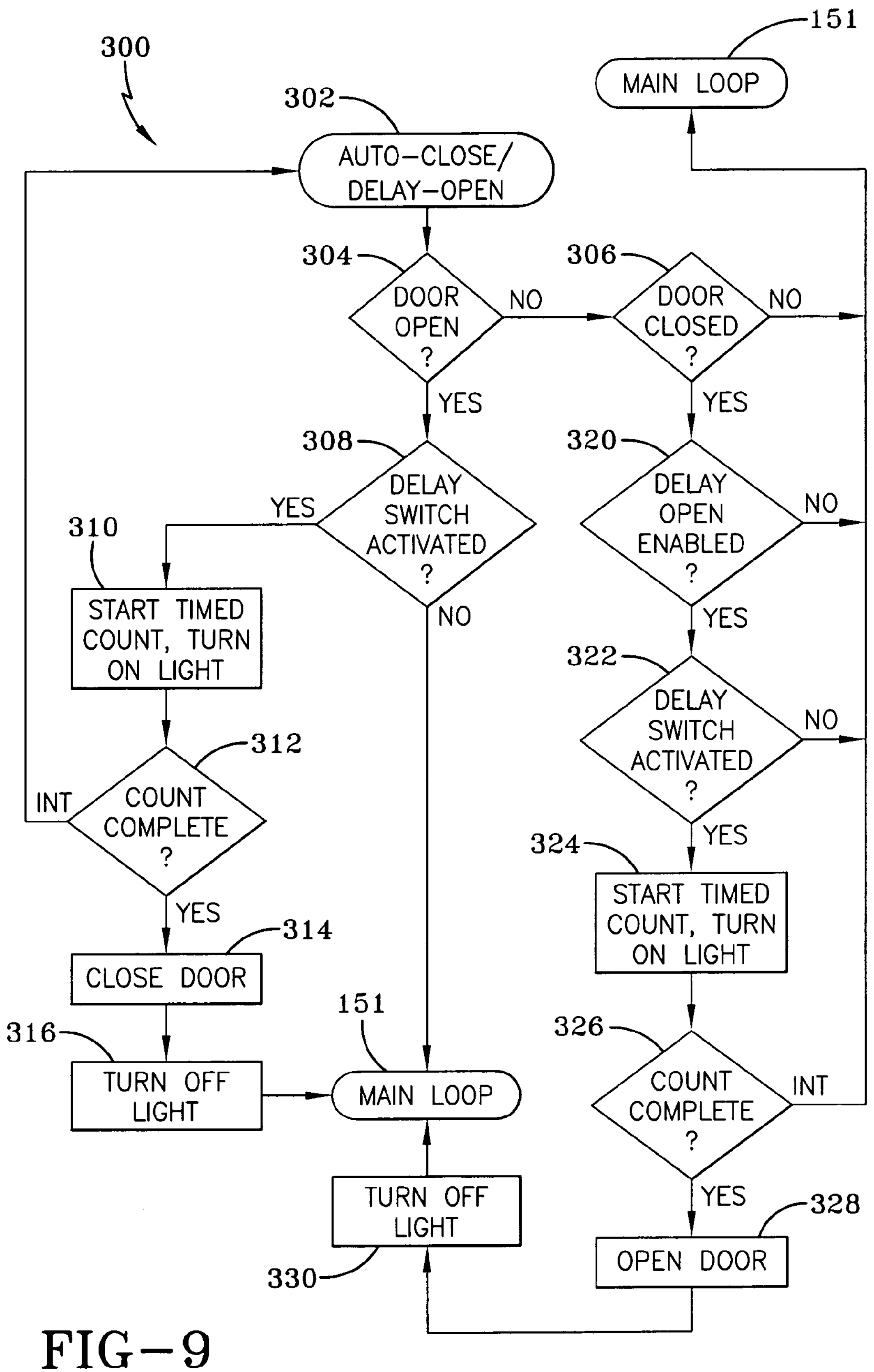
FIG. 9 is an operational flowchart setting out the operational steps for a delay-open feature.

Referring now to FIG. 9, it can be seen that an operational flow chart designating the steps for implementing the delay-open feature is designated generally by the numeral 300. These steps are initiated by an auto-close/delay-open routine designated by numeral 302. It will be appreciated that this mode is enabled when the selection switch 40 is in the auto-close/delay-open mode as previously discussed. Although the auto-close feature has been discussed in detail in FIGS. 6 and 7, this particular routine is for an embodiment in which a delay-open feature is incorporated into the operator's software. Whenever the auto-close/delay-open routine is called by the operator system, an initial inquiry is made at step 304 to determine whether the door or barrier is in an open position. If the door is not in an open position, then the controller inquires at step 306 as to whether the door is in a fully closed position. If not, then the routine is exited and returns to step 302. If, however, at step 304 it is determined that the door is in a fully-opened position, then the controller determines whether the delay switch 46 has been activated or not. If the delay switch has been activated and the door is in a fully open condition as determined at step 304, a timed count is started by the controller and the light 72 is turned on. The controller then awaits completion of the count at step 312. If the count is interrupted (INT in FIG. 9) for whatever reason, such as by a actuation of another button on the wall station or other received command, then the process is exited and returned to step 302. However, if the count is completed, the door closes at step 314 and the light is turned off at step 316. Following this, the process returns to step 151 which is an indication of the main loop control. Step 151 as seen in FIG. 6.

Returning to step 308, if the delay switch has not yet been activated, then the process returns to step 151 (FIG. 6) to allow implementation of the auto-close procedure.

Returning now to step 306, if it is determined that the door is in the fully closed position, then the controller inquires as to whether the delay-open mode—as set by the selector switch 40—is enabled or not. If that mode is not enabled, then the process returns to step 151. If, however, the delay-open feature is enabled, then at step 322 the controller determines whether the delay switch 46 has been activated or not. If the delay switch has not been activated, then the process returns to the main loop at step 151. However, if the delay switch has been activated at step 322, then a timed count is started and the light 72 is turned on. At step 326 the controller determines whether the count has been completed or not. If some type of button interruption (INT in FIG. 9) has occurred at the main wall station or other remote transmitting device, then the main loop is accessed and the count is rendered incomplete. However, if the count is completed at step 326, then the controller instructs the barrier or door to be opened at step 328. Upon completion of the door opening operation, the light 72 is turned off at step 330 and the controller returns to the main loop of the controller at step 151.

Based upon the foregoing, the advantages of the present invention are readily apparent. In regard to the multi-function wall station, it provides a means for disabling the operator from receiving radio frequencies or other wireless transmission signals for all operational commands of the operator from any "external" transmitter. And the 3-way selection switch provides a way to activate and deactivate the auto-close/delay-open feature. The lighted feature of the wall station is also believed to be unique inasmuch as it assists the user finding the wall station in a dimly lit environment. Yet another advantage of the present invention is that the up/down button is associated with a hinged cover that prevents accidental depression of the other operational controls which are not commonly used. Still yet another advantage of the present invention is that two different motions are allowed to activate the operator-controlled garage lights wherein one of the switches is along the top of the wall station that can be located by sliding one's hand down the wall to activate and the other of the switches is on the outward face of the wall station for conventional horizontal motion activation. The wall station being battery powered also provides the benefit of eliminating the need for a wired wall station so as to remove unsightly wires and to significantly reduce installation time of the unit. In this regard, the wall station housing can be placed in any unrestricted location as long as it is within range of the wireless signal in communication with operator and within sight of the door.

The invention is also advantageous in that the auto-close feature is provided directly with the operator control system. As such, additional add-on components are not required for operation of the auto-close feature and the operation of the auto-close feature is greatly improved in regard to durability and implementation of all the other features in combination therewith. The delay function is adjustable if desired and the auto-close feature can be disabled or disarmed and returned to a manual-remote operation if needed.

Still yet another advantage of the present invention is that it may only be enabled and operational if a keyless entry transmitter has been taught to the garage door operator. Accordingly, if the user is outside of the garage or house and the auto-close feature automatically closes the garage door that person can use the externally mounted keyless entry transmitter to open the garage door. Conversely, if a keyless entry transmitter has not been taught to the garage door operator then the door will never close automatically by the auto-close feature. Yet another embodiment of the present invention is advantageous in that the auto-close timer is only activated if the door has received a command to move from a remote transmitter such as a hand-held transmitter or a keyless entry keypad.

Yet a further advantage of the present invention is that is allows for a user to actuate a delay button, get into their car during the delay time period, and then have the door open automatically afterwards. This is especially helpful on cold winter days when the person does not desire to be directly exposed during the time in which they leave their house, enter a garage and then subsequently enter their automobile. In the past, in order to avoid cold weather a person would normally enter their car, look for the remote transmitter and then open the barrier or garage door from inside their car. This is sometimes a slow process in the event the remote transmitter is not easily found. Actuating or opening the door in this manner also allows for the auto-close feature to be enabled such that after the user leaves the enclosed area, the door will automatically close after a predetermined period of time. This invention is also advantageous inasmuch as the delay time period between the time in which the delay switch is actuated and the door is actually opened may be adjusted by the end-user. Accordingly, if the time period is too short, it can be extended within a predetermined range of times.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An operator system for moving a barrier, comprising a motor;

an operator which controls operation of said motor, said motor moving the barrier between opened and closed positions;

a wall station having a wall station transmitter which sends operational signals to said operator;

an open/close switch maintained by said wall station that when actuated moves the barrier in the appropriate direction without any delay; and a delay switch connected to said wall station transmitter wherein if said delay switch is actuated while the barrier is in a closed position, said operator moves the barrier to an open position after a predetermined period of time.

2. The system according to claim 1, further comprising a light controlled by said operator, said operator turning said light on when said delay switch is activated, and said operator turning said light off a second predetermined period of time after the barrier moves to the open position.

3. The system according to claim 1 where if said delay switch is activated while the barrier is in an open position, said operator moves the barrier to a closed position after said pre-determined period of time.

4. The system according to claim 1, wherein said operator is capable of receiving operational signals from said wall station transmitter and any programmed transmitter;

said wall station comprising:

a manual close/(auto-close/delay-open)/block switch, wherein if a manual-close mode is selected said operator only closes the door upon receipt of a door close signal from one of said wall station and said programmed transmitter;

wherein if an auto-close/delay-open mode is selected said operator automatically closes the barrier if left open for a second predetermined period of time and opens the barrier after said predetermined period of time if said delay switch is activated; and wherein if a block mode is selected, said operator is precluded from receiving wireless operational signals from any source.

5. The system according to a claim 1, wherein activation of said delay switch only initiates delayed opening movement of the barrier if a mode switch enables delayed opening of the barrier.

6. The system according to claim 5, wherein said predetermined period of time is user-adjustable.

7. The system according to claim 6, further comprising a function switch connected to said wall station transmitter that when actuated sends one of said operational signals to said operator, wherein said pre-determined period of time is adjusted by actuating and holding said delay switch while pressing and releasing said function switch.

8. The system according to claim 7, further comprising a display device carried by said wall station, said display device showing a representation of said pre-determined period of time as said display switch is held and said function switch is activated.

9. A method for controlling movement of a barrier, comprising:

receiving operational signals from a transmitter device by an operator which controls movement of the barrier, wherein said transmitter device includes a delay switch and an open/close switch;

generating a delay open signal from said transmitter device when said delay switch is activated and while the barrier is in a closed position;

moving the barrier to an open position a predetermined period of time after said delay open signal is received by said operator;

generating no said delay open signal from said transmitter device when said open/close switch is activated; and moving the barrier to an open or closed position without any delay of said predetermined period after said open/close switch is activated.

10. The method according to claim 9, further comprising illuminating a light connected to said operator when said delay switch is activated; and turning said light off a second predetermined period of time after the barrier moves to the open position.

11. The method according to claim 9, further comprising generating a delay close signal when said delay switch is activated and the barrier is in an open position; and moving the barrier to the closed position after said predetermined period of time.

12. The method according to claim 9, further comprising enabling an auto-close/delay-open in one of the said transmitter device and said operator;

closing the barrier if left open for a second pre-determined period of time; and opening the barrier from the closed position if said delay switch is activated.

13. The method according to claim 12, further comprising adjusting said predetermined period of time.

14. The method according to claim 13, further comprising displaying said predetermined period of time during said adjusting step.

15. The method according to claim 14 further comprising activating and holding said delay switch while pressing and releasing some other function switch associated with said wall station transmitter to incrementally adjust said predetermined period of time.

* * * * *